(12) United States Patent
Toyota et al.

(10) Patent No.: US 8,378,946 B2
(45) Date of Patent: Feb. 19, 2013

(54) DISPLAY DEVICE

(75) Inventors: Yoshiaki Toyota, Koshigaya (JP); Mieko Matsumura, Kokubunji (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 571 days.

(21) Appl. No.: 12/625,640

(22) Filed: Nov. 25, 2009

(65) Prior Publication Data

US 2010/0134398 A1 Jun. 3, 2010

(30) Foreign Application Priority Data

Nov. 28, 2008 (JP) ................................. 2008-304441

(51) Int. Cl.
*G09G 3/36* (2006.01)

(52) U.S. Cl. ............... 345/92; 345/43; 345/76; 257/72; 257/66; 257/751; 257/761; 257/755; 257/316; 438/151

(58) Field of Classification Search .................. 345/92, 345/43, 76; 257/72, 761, 751, 66, 755, 316; 438/151

See application file for complete search history.

(56) References Cited

U.S. PATENT DOCUMENTS

| | | | | |
|---|---|---|---|---|
| 5,610,737 A | * | 3/1997 | Akiyama et al. | 349/47 |
| 6,636,193 B1 | * | 10/2003 | Asao et al. | 345/96 |
| 6,949,391 B2 | * | 9/2005 | You | 438/30 |
| 7,052,944 B2 | * | 5/2006 | Tanabe | 438/166 |
| 7,130,001 B2 | * | 10/2006 | Chang et al. | 349/43 |
| 7,884,370 B2 | * | 2/2011 | Huh et al. | 257/72 |
| 2009/0002591 A1 | * | 1/2009 | Yamazaki et al. | 349/43 |
| 2010/0032679 A1 | * | 2/2010 | Kawae et al. | 257/72 |

FOREIGN PATENT DOCUMENTS

JP 2005-167051 6/2005

* cited by examiner

*Primary Examiner* — Wayne Young
*Assistant Examiner* — Linh N Hoffner
(74) *Attorney, Agent, or Firm* — Antonelli, Terry, Stout & Kraus, LLP.

(57) ABSTRACT

A display device includes a plurality of thin-film transistors formed on a substrate on which a display area is formed. The display device also includes a gate electrode, a gate insulating film formed so as to cover the gate electrode, an semiconductor layer in an island shape formed on an upper surface of the gate insulating film so as to superimpose the gate electrode without protruding from the gate electrode when viewed planarly, an insulating film formed so as to cover the semiconductor layer, and a pair of electrodes electrically connected to the semiconductor layer respectively through a pair of through holes that are formed at the insulating film. The semiconductor layer is formed by sequentially laminating a crystalline semiconductor layer and an amorphous semiconductor layer. The pair of electrodes is respectively formed by sequentially laminating a semiconductor layer doped with impurities and a metal layer.

11 Claims, 10 Drawing Sheets

DISPLAY DEVICE

CROSS-REFERENCE TO RELATED APPLICATION

The present application claims priority from Japanese Application JP 2008-304441 filed on Nov. 28, 2008, the content of which is hereby incorporated by reference into this application.

BACKGROUND OF THE INVENTION

1. Field of the Invention

The present invention relates to a display device, in particular, a display device including thin-film transistors formed on a substrate.

2. Description of the Related Art

A so-called active-matrix display device includes a plurality of pixels arranged in matrix in a display area of a substrate. A thin-film transistor is formed in each of the plurality of pixels. The thin-film transistors are turned ON by scanning signals fed to gate signal lines, each being connected commonly to a group of pixels arranged in a row direction, thereby selecting the groups of pixels. Then, video signals fed through drain signal lines, each being connected commonly to a group of pixels arranged in a column direction, are respectively input to the pixels included in the selected groups of pixels through the thin-film transistors in an ON state, thereby driving the pixels.

The display device may include a scanning-signal drive circuit and a video-signal drive circuit that are formed in the periphery of the display area of the same substrate. The scanning-signal drive circuit feeds the scanning signals to the gate signal lines, whereas the video-signal drive circuit feeds the video signals to the drain signal lines. Each of the scanning-signal drive circuit and the video-signal drive circuit includes a plurality of thin-film transistors that are formed at the same time when the thin-film transistors are formed in the pixels.

In this case, some of the thin-film transistors include a crystalline semiconductor layer made of polysilicon or the like as a semiconductor layer, whereas the other thin-film transistors include an amorphous semiconductor layer made of amorphous silicon or the like as the semiconductor layer.

In recent years, however, a thin-film transistor having the following structure, for example, as disclosed in Japanese Patent Application Laid-open No. 2005-167051 is known. The thin-film transistor includes a source layer and a drain layer formed on a gate insulating film, which is formed so as to cover a gate electrode, through an intermediation of a channel layer. As the channel layer, a channel layer formed of a laminate of the amorphous semiconductor layer and the crystalline semiconductor layer which is provided between the amorphous semiconductor layer and the gate insulating film is known. The thin-film transistor having the structure described above has effects of reducing a so-called S value (swing factor) corresponding to one of initial characteristics and keeping a variation in threshold voltage with time small.

In the thin-film transistor disclosed in Japanese Patent Application Laid-open No. 2005-167051, however, the laminate of the amorphous semiconductor layer and the crystalline semiconductor layer is formed in an island shape. Each of a source electrode formed on the source layer and a drain electrode formed on the drain layer is formed so as to extend along a side wall surface of the laminate so as to be superimposed on the gate insulating film.

In such a structure, the source electrode and the drain layer are in contact with each other on the side wall surfaces of the crystalline semiconductor layer. As a result, a so-called off-leak current is disadvantageously increased.

When the thin-film transistor having the above-mentioned structure is used as a transistor for pixel selection, there arises a problem that contrast of the display area is prevented from being improved.

SUMMARY OF THE INVENTION

An object of one or more embodiments of the present invention is to provide a display device including a thin-film transistor that reduces an off-leak current.

The display device according to one or more embodiments of the present invention is configured, for example, as follows.

(1) A display device according to one or more embodiments of the present invention includes a plurality of thin-film transistors formed on a substrate on which a display area is formed. The display device includes a gate electrode, a gate insulating film formed so as to cover the gate electrode, an semiconductor layer in an island shape formed on an upper surface of the gate insulating film so as to superimpose the gate electrode without protruding from the gate electrode when viewed planarly, an insulating film formed so as to cover the semiconductor layer, and a pair of electrodes electrically connected to the semiconductor layer respectively through a pair of through holes that are formed at the insulating film. The semiconductor layer is formed of a laminate obtained by sequentially laminating a crystalline semiconductor layer and an amorphous semiconductor layer. The pair of electrodes is respectively formed of a laminate obtained by sequentially laminating a semiconductor layer doped with impurities and a metal layer.

(2) In one or more embodiments of the present invention according to Item (1), the display device includes a display area on a substrate, including a plurality of pixels that respectively includes a first thin-film transistor therein. The display device also includes a peripheral circuit formed in a periphery of the display area and on the substrate. The peripheral circuit includes a second thin-film transistor therein. The first thin-film transistor includes a gate electrode, a gate insulating film formed so as to cover the gate electrode, an semiconductor layer in an island shape formed on an upper surface of the gate insulating film so as to superimpose the gate electrode without protruding from the gate electrode when viewed planarly, an insulating film formed so as to cover the semiconductor layer, and a pair of electrodes electrically connected to the semiconductor layer respectively through a pair of through holes that are formed through the insulating film. The semiconductor layer of the first thin-film transistors is formed of a laminate obtained by sequentially laminating a crystalline semiconductor layer and an amorphous semiconductor layer. Each of the pair of electrodes is formed of a laminate obtained by sequentially laminating a semiconductor layer doped with impurities and a metal layer. The second thin-film transistors includes a gate electrode, a gate insulating film formed so as to cover the gate electrode, an semiconductor layer in an island shape formed on an upper surface of the gate insulating film so as to superimpose the gate electrode without protruding from the gate electrode when viewed planarly, and a pair of electrodes formed on a surface of the semiconductor layer. The semiconductor layer of the second thin-film transistors is formed of the laminate obtained by sequentially laminating the crystalline semiconductor layer and the amorphous semiconductor layer, and each of the pair of electrodes is formed of the laminate obtained by sequentially laminating the semiconductor layer doped with the impurities and the metal layer.

(3) In one or more embodiments of the present invention according to Item (2), the second thin-film transistor further includes an insulating film formed so as to cover the semiconductor layer. The pair of electrodes is electrically connected to the semiconductor layer respectively through a pair of through holes that are formed at the insulating film.

(4) In one or more embodiments of the present invention according to Item (2), one electrode of the pair of electrodes is electrically connected to the gate electrode through a contact hole formed at the gate insulating film in the second thin-film transistor.

(5) In one or more embodiments of the present invention according to Item (2), the amorphous semiconductor layer is exposed on a surface of the semiconductor layer by etching, and the surface of the semiconductor layer is exposed from the pair of electrodes in the second thin-film transistor.

(6) In one or more embodiments of the present invention according to Item (2), the insulating film is partially formed on a surface of the semiconductor layer, and ends of the pair of electrodes that are opposed to each other are respectively formed so as to be superimposed on the insulating film in the second thin-film transistor.

(7) A display device according to one or more embodiments of the present invention includes a display area on a substrate including a plurality of pixels that include a first thin-film transistor therein. The display device also includes a peripheral circuit formed in a periphery of the display area and on the substrate. The peripheral circuit includes a second thin-film transistor therein. The first thin-film transistors includes a gate electrode, a gate insulating film formed so as to cover the gate electrode, an semiconductor layer in an island shape formed on an upper surface of the gate insulating film so as to superimpose the gate electrode without protruding from the gate electrode when viewed planarly, an insulating film formed so as to cover the semiconductor layer, and a pair of electrodes electrically connected to the semiconductor layer respectively through a pair of through holes formed through the insulating film. The semiconductor layer of the first thin-film transistors is formed of a laminate obtained by sequentially laminating a crystalline semiconductor layer and an amorphous semiconductor layer. Each of the pair of electrodes is formed of a laminate obtained by sequentially laminating a semiconductor layer doped with impurities and a metal layer. Each of the second thin-film transistors includes a gate electrode, a gate insulating film formed so as to cover the gate electrode, an semiconductor layer in an island shape formed on an upper surface of the gate insulating film so as to superimpose the gate electrode and to protrude from the gate electrode in a width direction of the gate electrode as viewed planarly, and a pair of electrodes formed on a surface of the semiconductor layer. The semiconductor layer of the second thin-film transistors is formed of a laminate obtained by sequentially laminating the crystalline semiconductor layer and the amorphous semiconductor layer. The pair of electrodes is formed of the laminate obtained by sequentially laminating the semiconductor layer doped with the impurities and the metal layer. The pair of electrodes is formed to extend in the width direction of the gate electrode.

(8) In one or more embodiments of the present invention according to Item (7), one electrode of the pair of electrodes is electrically connected to the gate electrode through a contact hole formed at the gate insulating film in the second thin-film transistor.

(9) In one or more embodiments of the present invention according to Item (7), the amorphous semiconductor layer is exposed by etching on a surface of the semiconductor layer, and the surface of the semiconductor layer is exposed from the pair of electrodes in the second thin-film transistors.

(10) In one or more embodiments of the present invention according to Item (7), the insulating film is partially formed on a surface of the semiconductor layer, and ends of the pair of electrodes that are opposed to each other are formed so as to be superimposed on the insulating film in the second thin-film transistor.

(11) In one or more embodiments of the present invention according to any one of Items (1) to (10), the display device includes a liquid crystal display device.

(12) In one or more embodiments of the present invention according to any one of Items (1) to (10), the display device includes an organic EL (electroluminescent) display device.

In addition, the above-mentioned structure is merely illustrative, and the present invention can be appropriately changed without departing from the technical idea of the present invention. Moreover, examples of the structure of the present invention other than that described above are made apparent from the whole description of the specification of the present application or the accompanying drawings.

The display device configured as described above includes a thin-film transistor that reduces an off-leak current.

The other effects of the present invention are made apparent from the whole description of the specification.

DETAILED DESCRIPTION OF THE INVENTION

Embodiments of the present invention are described with reference to the drawings. The same or similar components are denoted by the same reference numerals in each of the drawings and each of the embodiments, and the superimposing description thereof is omitted.

First Embodiment

A first embodiment of a display device of the present invention is described taking a liquid crystal display device as an example.

(Equivalent Circuit)

Figure 2:
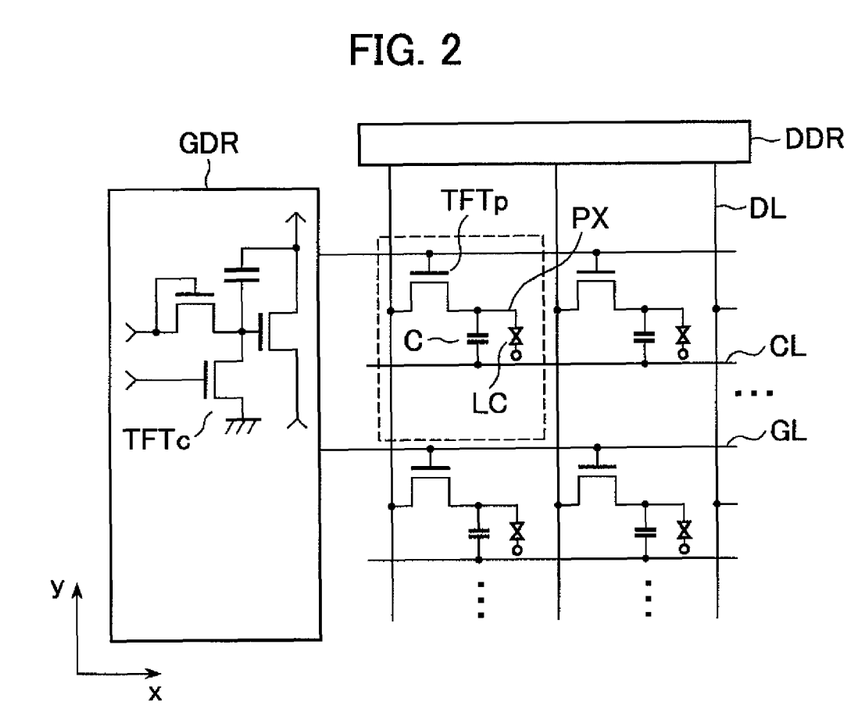
FIG. 2 is an equivalent circuit diagram of a liquid crystal display device corresponding to the display device according to one or more embodiments of the present invention.

FIG. 2 is a diagram illustrating an equivalent circuit of the liquid crystal display device according to one or more embodiments of the present invention. FIG. 2 illustrates a circuit formed on a surface of one substrate of a pair of substrates which are arranged to be opposed to each other with a liquid crystal being interposed therebetween, the surface being on the liquid crystal side. Even though FIG. 2 illustrates the equivalent circuit, the equivalent circuit is geometrically substantially similar to an actual circuit of the liquid crystal display device.

In FIG. 2, there are provided gate signal lines GL and drain signal lines DL. The gate signal lines GL extend in an x-direction and are arranged in parallel to each other in a y-direction, whereas the drain signal lines DL extend in the y-direction and are arranged in parallel to each other in the x-direction. For example, a left end of each of the gate signal lines GL in FIG. 2 is connected to a gate driver GDR so that a scanning signal is fed by the gate driver GDR to each of the gate signal lines GL. For example, an upper end of each of the drain signal lines DL in FIG. 2 is connected to a drain driver DDR so that a video signal is fed by the drain driver DDR to each of the drain signal lines DL.

An area surrounded by a pair of the gate signal lines GL adjacent to each other and a pair of the drain signal lines DL adjacent to each other becomes a pixel area. The pixel area is formed to include a thin-film transistor TFT (denoted by TFTp in FIG. 2), a pixel electrode PX, and a capacitor C. The thin-film transistor TFTp is turned ON by the scanning signal from the gate signal line. Through the thin-film transistor TFTp which is turned ON, the video signal from the drain signal line DL is fed to the pixel electrode PX. The capacitor C is formed between the pixel electrode PX and a common signal line CL. The common signal line CL is formed between the adjacent gate signal lines GL in parallel to the gate signal lines GL. The capacitor C is provided to store the video signal fed to the pixel electrode PX for a relatively long time. The pixel electrode PX generates an electric field with a counter electrode formed on the other substrate which is arranged to be opposed to the substrate, on which the pixel electrode PX is provided, through the liquid crystal. The generated electric field causes liquid crystal molecules in the pixel area to behave. The liquid crystal display device including the pixels as described above is called, for example, a longitudinal electric-field type liquid crystal display device. The present invention is also applicable to, for example, a so-called lateral electric-field type liquid crystal display device.

Here, the gate driver GDR is formed by, for example, a bootstrap circuit. The bootstrap circuit is formed by a plurality of the thin-film transistors TFT (denoted by TFTc in FIG. 2). The thin-film transistors TFTc are formed on the same substrate, on which the thin-film transistor TFTp formed in each of the pixels is formed, and are formed in parallel to the formation of the thin-film transistor TFTp.

(Pixel Structure)

Figure 1A:
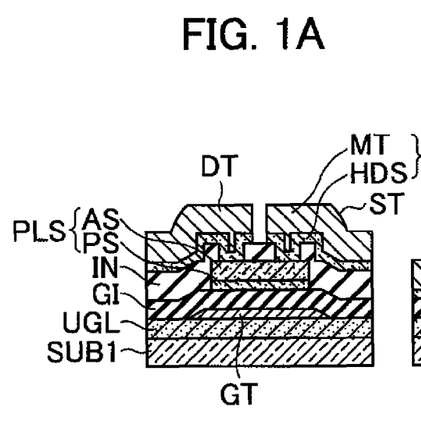
FIGS. 1A and 1B are cross-sectional views, each illustrating a thin-film transistor included in a display device according to one or more embodiments of the present invention.
Figure 3:
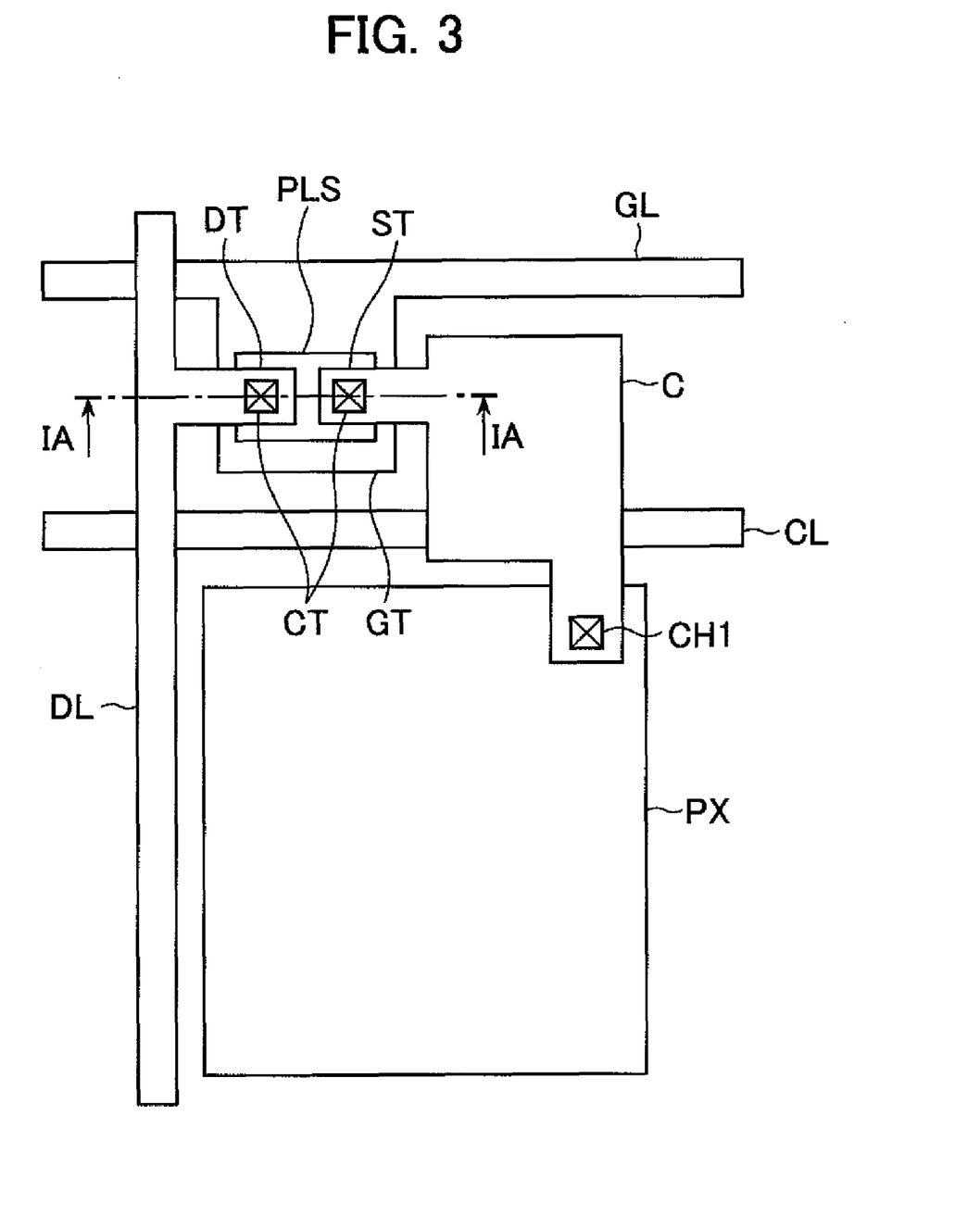
FIG. 3 is a plan view illustrating a structure of a pixel of the liquid crystal display device corresponding to the display device according to one or more embodiments of the present invention.

FIG. 3 is a plan view illustrating a structure of the pixel area (area surrounded by the dot-line frame illustrated in FIG. 2). A cross section taken along a line IA-IA in FIG. 3 is illustrated in FIG. 1A.

In FIG. 3, a substrate SUB1 (see FIG. 1A) is provided. On a surface of the substrate SUB1, an underlayer film UGL (see FIG. 1A) made of, for example, a silicon oxide film is formed. On a surface of the underlayer film UGL, the gate signal line GL is formed. A gate electrode GT corresponding to a projecting portion formed on the gate signal line GL is integrally formed with a part of the gate signal line GL. The common signal line CL is formed on the surface of the underlayer film UGL in the proximity of the gate signal line GL to be parallel to the gate signal line GL.

On the upper surface of the substrate SUB1, an insulating film GI (see FIG. 1A) is formed so as to cover the gate signal line GL (gate electrode GT) and the common signal line CL. The insulating film GI functions as a gate insulating film in an area where the thin-film transistor TFTp is formed.

A laminate obtained by sequentially laminating a polycrystalline semiconductor layer PS and an amorphous semiconductor layer AS (hereinafter, the laminate is also referred to as a semiconductor laminate PLS) is formed on an area of an upper surface of the insulating film GI, which superimposes the gate electrode GT. The semiconductor laminate PLS is formed in an island-shape. When viewed planarly, the semiconductor laminate PLS is formed so as to superimpose the gate electrode GT without protruding from the gate electrode GT. The formation of the semiconductor laminate PLS without protruding from the gate electrode GT as viewed planarly as described above is for blocking light emitted from a backlight provided on the back side of the substrate SUB1 by the gate electrode GT so as to avoid a leak current, which may otherwise be generated in the semiconductor laminate PLS by irradiation of the light.

On the upper surface of the substrate SUB1, an interlayer insulating film IN is formed so as to cover the semiconductor laminate PLS. On an upper surface of the interlayer insulating film IN, the drain signal line DL, a drain electrode DT of the thin-film transistor TFTp, and a source electrode ST of the thin-film transistor TFTp are formed. The drain electrode DT is formed to extend from the drain signal line DL. The source electrode ST is arranged to be opposed to the drain electrode DT. The source electrode ST extends so as to superimpose the common signal line CL. An end of the source electrode ST is electrically connected to the pixel electrode PX described below. The capacitor C is formed in a superimposing portion of the source electrode ST and the common signal line CL.

Each of the drain signal line DL, the drain electrode DT, and the source electrode ST is made of a laminate obtained by sequentially laminating a heavily-doped semiconductor layer HDS and a metal film MT (hereinafter, the laminate is also referred to as a conductive laminate PLC). As shown in FIG. 1A, each of the drain electrode DT and the source electrode ST is electrically connected to the amorphous semiconductor layer AS that is formed at an upper layer of the semiconductor laminate PLS through a contact hole CH that is formed in advance at the interlayer insulating film IN.

On the upper surface of the substrate SUB1, a protective film (not shown) is formed so as to cover the drain signal line DL, the drain electrode DT, and the source electrode ST. On an upper surface of the protective film, the pixel electrode PX made of a transparent conductive film such as an indium tin oxide (ITO) film is formed. The pixel electrode PX is connected to the source electrode ST of the thin-film transistor TFTp through a contact hole CH1 which is formed in advance through the protective film.

The thin-film transistor TFTp is formed to have the above-mentioned structure such that the interlayer insulating film IN prevents electrical contact among the drain electrode D, the source electrode ST, and the polycrystalline semiconductor layer PS. As a result, an off-leak current can be reduced to enhance contrast of images.

(Partial Structure of the Gate Driver)

Figure 1B:
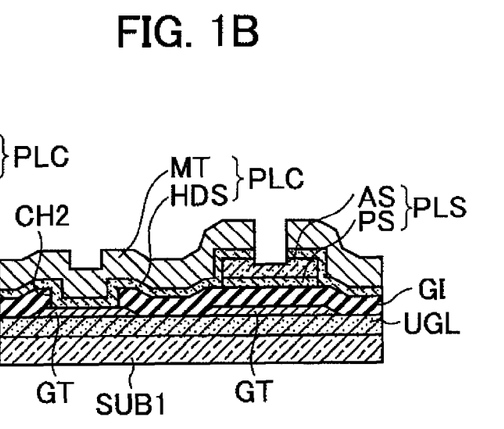
Figure 4:
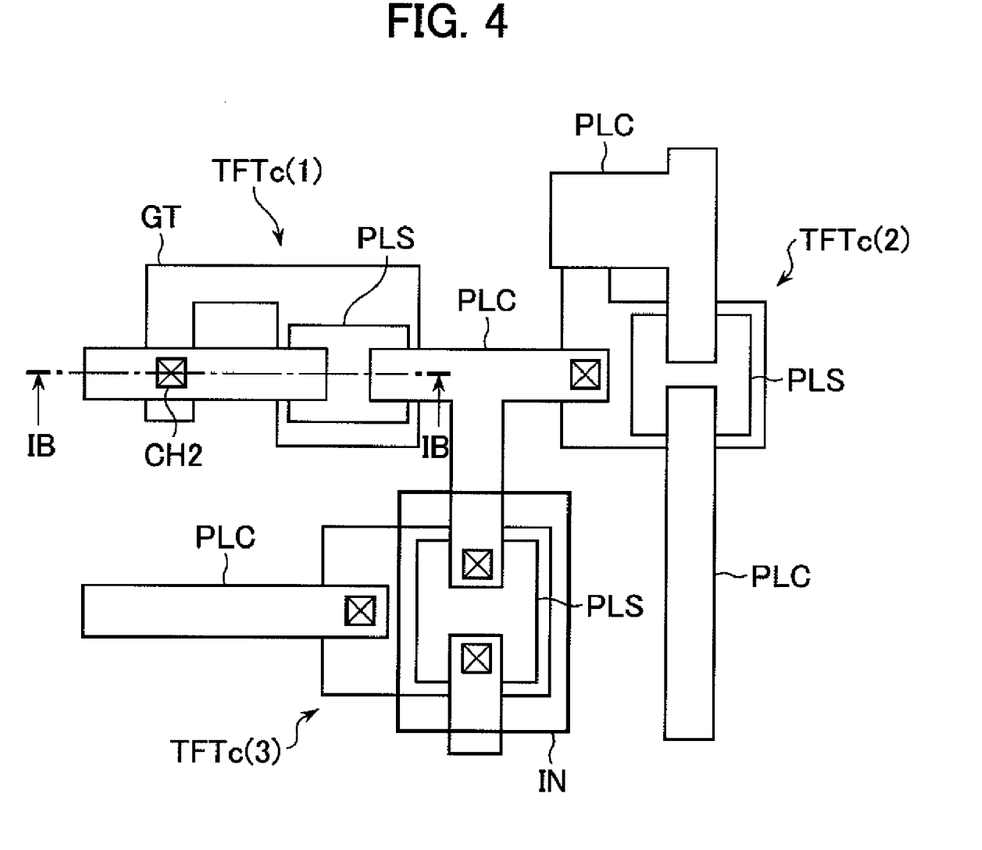
FIG. 4 is a plan view illustrating an embodiment of a structure of a part of a peripheral circuit of the liquid crystal display device corresponding to the display device according to one or more embodiments of the present invention.

FIG. 4 is a plan view of the bootstrap circuit constituting a part of the gate driver GDR. The bootstrap circuit is illustrated in FIG. 4 so as to geometrically correspond to the bootstrap circuit (equivalent circuit) illustrated in FIG. 2. A cross section taken along a line IB-IB in FIG. 4 is illustrated in FIG. 1B.

In FIG. 4, three thin-film transistors TFTc are formed (respectively denoted by TFTc(1), TFTc(2), and TFTc(3) in FIG. 4). The thin-film transistors TFTc(1), TFTc(2), and TFTc(3) are formed in parallel to the formation of the thin-film transistor TFTp included in each pixel. Therefore, each of the thin-film transistors TFTc(1), TFTc(2), and TFTc(3) is formed as a bottom-gate type thin-film transistor. The semiconductor layer included in each of the thin-film transistors TFTc(1), TFTc(2), and TFTc(3) is formed of the semiconductor laminate PLS formed by sequentially laminating the polycrystalline semiconductor layer PS and the amorphous semiconductor layer AS. Each of the drain electrode DT and the source electrode ST is formed of the conductive laminate PLC formed by sequentially laminating the heavily-doped semiconductor layer HDS and the metal film MT.

Here, the thin-film transistor TFTc(1) does not include the interlayer insulating film IN in the area where the thin-film transistor TFTc(1) is formed. The gate electrode is electrically connected to any one of the drain electrode DT and the source electrode ST. In this manner, the thin-film transistor TFTc(1) is formed to have functions of a diode. As illustrated in FIG. 1B that shows the cross-sectional view taken along the line IB-IB in FIG. 4, the interlayer insulating film IN is not formed, and hence the drain electrode DT and the source electrode ST of the thin-film transistor TFTc(1) are formed by extending along side wall surfaces of the semiconductor laminate PLS so as to be located above the insulating film GI. One of the drain electrode DT and the source electrode ST is electrically connected to the gate electrode GT through a contact hole CH2 that is formed through the insulating film GI. The insulating film GI has a relatively small thickness, and, hence, the contact hole CH2 can be formed to have a small diameter. Therefore, a space for forming the gate driver GDR can be reduced.

The thin-film transistor TFTc(2) also has the structure which does not include the interlayer insulating film IN in the area where the thin-film transistor TFTc(2) is formed. Although a cross section of the thin-film transistor TFTc(2) is not illustrated, a cross-sectional structure of the thin-film transistor TFTc(2) is substantially the same as a right-hand structure of the cross-sectional view illustrated in FIG. 1B.

Further, the thin-film transistor TFTc(3) includes the interlayer insulating film IN in the area where the thin-film transistor TFTc(3) is formed. Although a cross section of the thin-film transistor TFTc(3) is not illustrated, a cross-sectional structure of the thin-film transistor TFTc(3) is substantially the same as the structure illustrated in the cross-sectional view of FIG. 1A.

In the thin-film transistors TFTc formed to have the above-mentioned structures, the drain electrode DT, the source electrode ST, and the polycrystalline semiconductor layer PS are electrically connected to each other by omitting the formation of the interlayer insulating film IN, for example, as in the case of the thin-film transistors TFTc(1) and TFTc(2). As a result, an ON current can be increased to enhance performance of the circuit. In this case, for example, when a capacitor like the thin-film transistor TFTc(3) is to be retained/refreshed, for example, the interlayer insulating film IN covering the semiconductor laminate PLS is formed as in the case of the thin-film transistor TFTp formed in the pixel such that malfunction of the circuit can be reduced.

Each of all the thin-film transistors TFTc formed in the gate driver GDR includes the conductive laminate PLS which is formed without protruding from the gate electrode GT as viewed planarly. This is because the gate electrode GT prevents the light emitted from the backlight that is provided on the back side of the substrate SUB1 so as to avoid a leak current that is generated in the semiconductor laminate PLS by irradiation of light The above-mentioned thin-film transistors TFTc is regarding the thin-film transistors formed in the gate driver GDR. However, the structure of the thin-film transistors as described above is also applicable to the thin-film transistors formed in the drain driver DDR. In short, the above-mentioned structure can be applied to the thin-film transistors constituting a circuit formed in the periphery of the display area (peripheral circuit).

(Manufacturing Method)

FIGS. 5A to 5C and 6A to 6C are explanatory views illustrating a method of manufacturing the display device of the present invention. Each of FIGS. 5A to 5C and 6A to 6C illustrates a step performed in the areas corresponding to FIGS. 1A and 1B. Hereinafter, the manufacturing method is described in order of the steps.

Figure 5A:
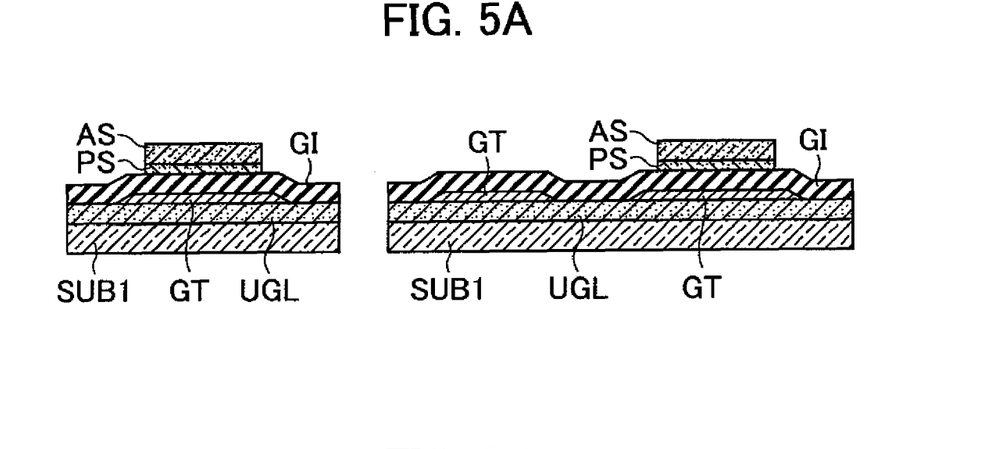
FIGS. 5A to 5C are views illustrating the embodiment of a method of manufacturing the display device according to one or more embodiments of the present invention, each illustrating each of a series of steps together with FIGS. 6A to 6C.

Step 1 (FIG. 5A)

The substrate SUB1 made of, for example, glass is prepared. On a main surface of the substrate SUB1, the underlayer film UGL made of, for example, a silicon oxide film is formed at a thickness of about 300 nm. On the upper surface of the underlayer film UGL, the gate electrode GT and the like, which are made of a patterned metal film (for example, a patterned Al film), is formed at a thickness of about 150 nm. The insulating film GI made of, for example, a silicon oxide film is formed at a thickness of about 100 nm on the upper surface of the underlayer film UGL so as to cover the gate electrode GT and the like. The insulating film GI functions as the gate insulating film in the area where each of the thin-film transistors TFT is formed. On the upper surface of the insulating film GI, the laminate obtained by sequentially laminating the polycrystalline semiconductor layer PS made of polysilicon and the amorphous semiconductor layer AS made of amorphous silicon is formed. The laminate obtained by sequentially laminating the polycrystalline semiconductor layer PS and the amorphous semiconductor layer AS is formed in an island shape so as to superimpose the gate electrode GT. The polycrystalline semiconductor layer PS is formed at a thickness of, for example, about 50 nm, whereas the amorphous semiconductor layer AS is formed at a thickness of, for example, about 150 nm. The polycrystalline semiconductor layer PS can be formed by, for example, forming an amorphous silicon film and then crystallizing the amorphous silicon film using a laser annealing method or the like.

Figure 5B:
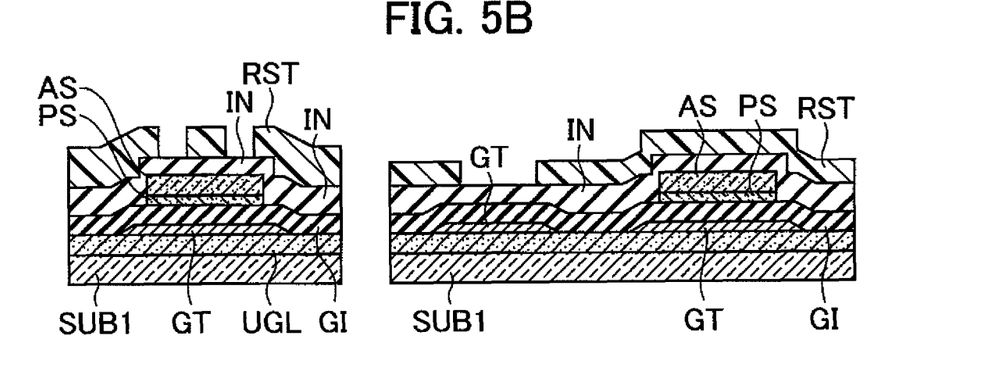

Step 2 (FIG. 5B)

On the upper surface of the substrate SUB1, the interlayer insulating film IN made of, for example, a silicon nitride film is formed at a thickness of about 500 nm so as to cover the laminate obtained by sequentially laminating the polycrystalline semiconductor layer PS and the amorphous semiconductor layer AS and the like. Next, a photoresist is applied onto the upper surface of the interlayer insulating film IN. By a photolithography technique using a so-called half-tone exposure, the patterned photoresist film RST having portions different in thickness is formed.

The photoresist film RST has the following pattern. The photoresist film RST has a larger thickness on the thin-film transistor TFTp side and has holes, each being formed in a region where the electrode is to be formed. On the other hand, the photoresist film RST has a smaller thickness on the thin-film transistor TFTc side and has a hole formed in a region where the contact hole CH2 is to be formed. The photoresist film RST on the thin-film transistor TFTc side does not have a hole in a region where the electrode is to be formed.

Figure 5C:
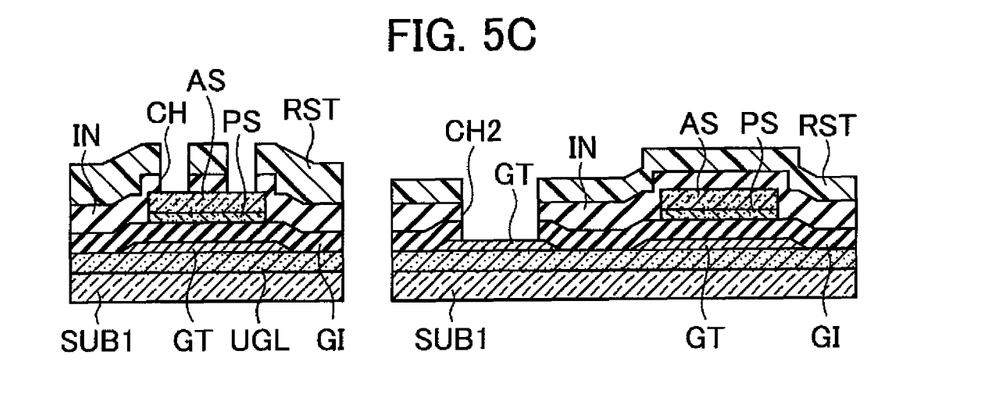

Step 3 (FIG. 5C)

The interlayer insulating film IN is etched using the photoresist film RST as a mask. As a result, the contact holes CH for the electrodes of the thin-film transistor TFTp are formed through the interlayer insulating film IN on the thin-film transistor TFTp side, whereas the contact hole CH2 is formed through the interlayer insulating film IN on the thin-film transistor TFTc side.

Figure 6A:
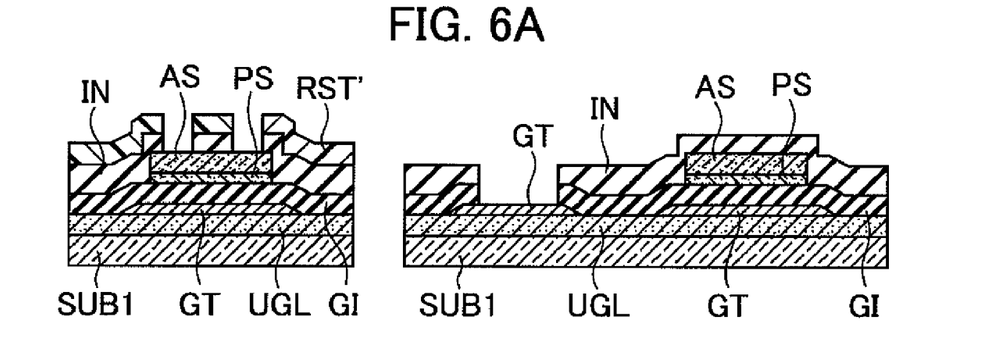
FIGS. 6A to 6C are views illustrating the embodiment of the method of manufacturing the display device according to one or more embodiments of the present invention, each illustrating each of the series of steps together with FIGS. 5A to 5C.

Step 4 (FIG. 6A)

The photoresist film RST is subjected to a so-called half-ashing process. As a result, the photoresist film RST is fully removed on the thin-film transistor TFTc side where the photoresist film RST was formed to have a small thickness. On the other hand, the photoresist film RST remains with a reduced thickness (hereinafter, the photoresist film with the reduced thickness is denoted by RST' in FIGS. 6A and 6B) on the thin-film transistor TFTp side where the photoresist film RST was formed to have the large thickness.

Figure 6B:
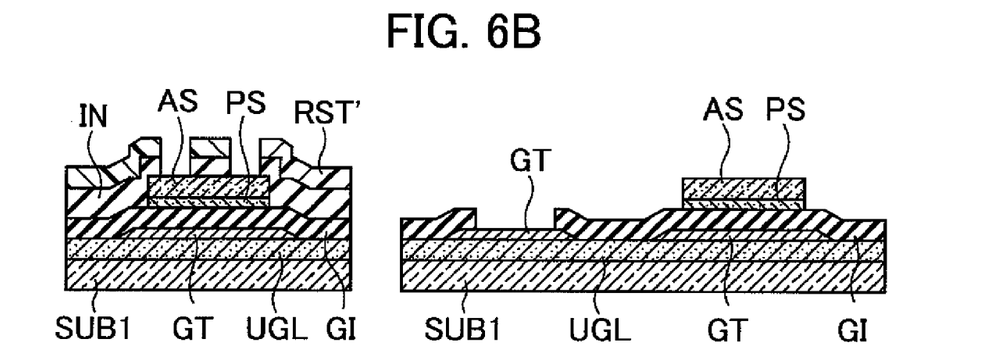

Step 5 (FIG. 6B)

The interlayer insulating film IN is etched using the photoresist film RST' as a mask. The etching in this step is suitably performed by, for example, wet etching. As a result, the interlayer insulating film IN on the thin-film transistor TFTc side is removed, whereas the interlayer insulating film IN on the thin-film transistor TFTp side still remains.

Figure 6C:
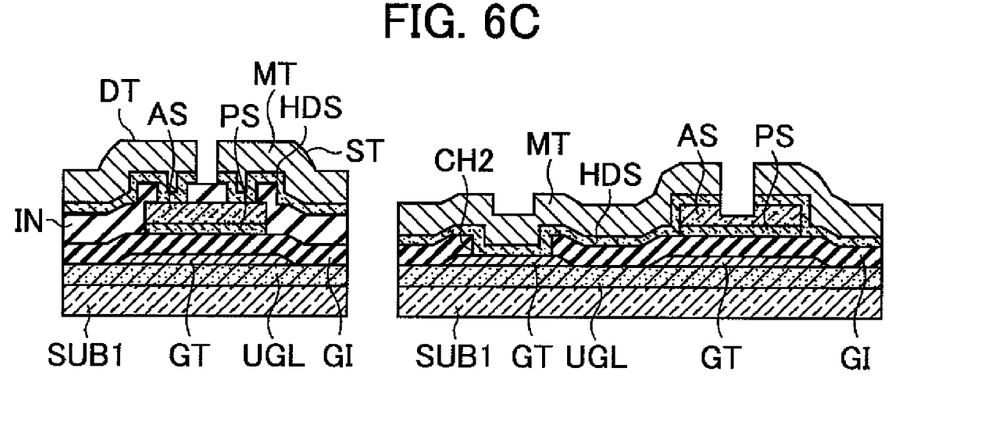

Step 6 (FIG. 6C)

The photoresist film RST' is removed. Then, on the upper surface of the substrate SUB1, the heavily-doped semiconductor layer HDS made of amorphous silicon doped with impurities at a high concentration and the metal film MT are sequentially formed. The laminate obtained by sequentially laminating the heavily-doped semiconductor layer HDS and the metal film MT is patterned using selective etching according to a photolithography technique. As a result, each of the electrodes of the thin-film transistor TFTp, wirings connected to the electrodes thereof, each of the electrodes of the thin-film transistor TFTc, and wirings connected to the electrodes thereof are formed.

The etching in Step 6 is performed until the heavily-doped semiconductor layer HDS is fully removed in a region between the electrodes of the thin-film transistor TFTc and until the amorphous semiconductor layer AS that is the underlayer of the heavily-doped semiconductor layer HDS is slightly concaved (until a concave portion is formed). Such etching is for perfect electrical isolation between the electrodes.

Second Embodiment

Figure 7A:
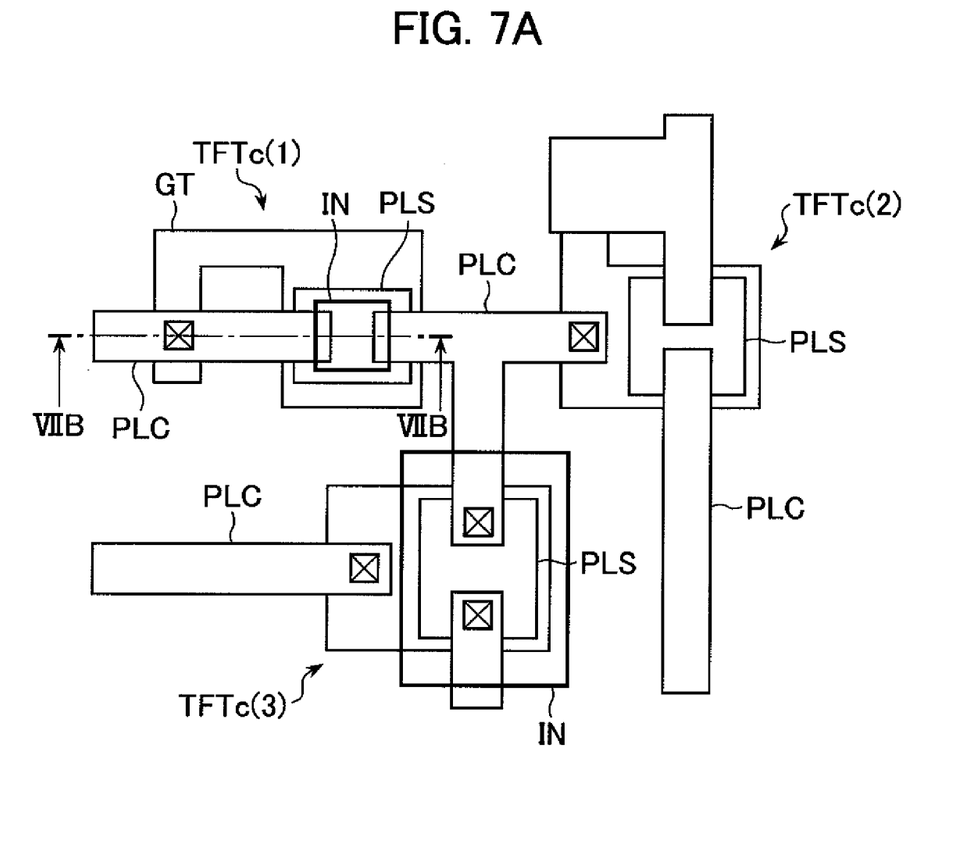
FIG. 7A is a plan view illustrating another embodiment of a structure of a part of a peripheral circuit of a liquid crystal display device corresponding to a display device according to one or more embodiments of the present invention.
Figure 7B:
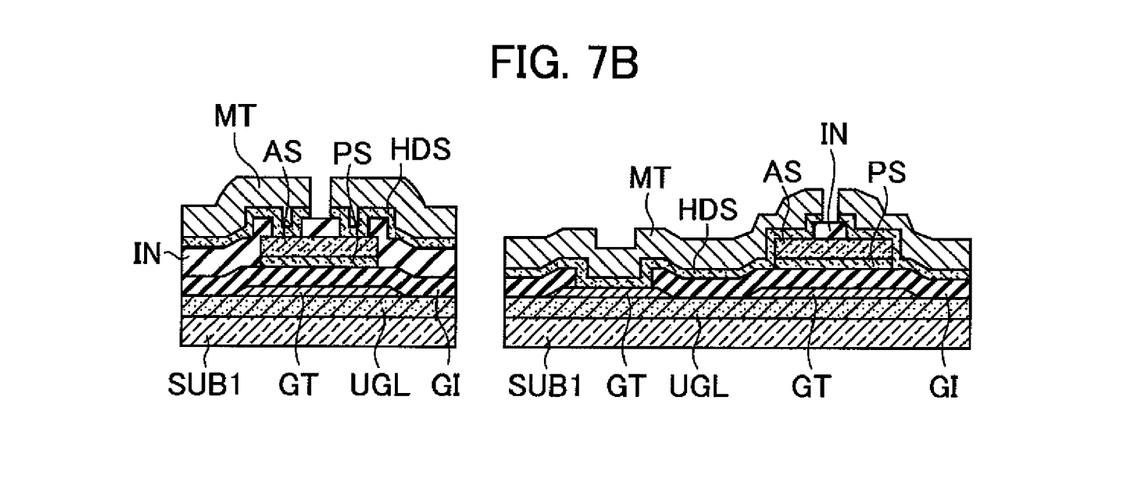
FIG. 7B is a cross-sectional view of a thin-film transistor included in the peripheral circuit and a thin-film transistor formed in the pixel.

FIG. 7A is a plan view illustrating a second embodiment of the structure of the display device according to the present invention, which corresponds to FIG. 4. FIG. 7B is a cross-sectional view taken along a line VIIB-VIIB in FIG. 7A. In FIG. 7B, the thin-film transistor TFTp included in the pixel is also illustrated on the left side thereof for facilitating the comparison.

The structure illustrated in FIG. 7A differs from that illustrated in FIG. 4 in that the interlayer insulating film IN is formed on a central portion of the semiconductor laminate PLS of the thin-film transistor TFTc(1) that is included in the bootstrap circuit. The interlayer insulating film IN is simultaneously formed with the formation of the interlayer insulating film IN which covers the semiconductor layer of the thin-film transistor TFTp in the pixel area. Further, the drain electrode and the source electrode are formed on sides of an area of the surface of the semiconductor laminate PLS, which is exposed from the interlayer insulating film IN. The sides of the area are in the same direction as a width direction of the gate electrodes GT. Each of the drain electrode and the source electrode is formed of the conductor laminate PLC obtained by sequentially laminating the heavily-doped semiconductor layer HDS and the metal film MT. An end of the drain electrode and an end of the source electrode, which are opposed to each other, are formed so as to be superimposed on the interlayer insulating film IN, as illustrated in FIG. 7B.

When the thin-film transistor TFTc(1) is formed to have the structure described above, the interlayer insulating film IN functions as an etching stopper during the formation of the drain electrode and the source electrode by the selective etching. Therefore, in comparison with the case illustrated in FIG. 4, etching damages are not caused on the surface of the semiconductor laminate PLS so that the thickness of the semiconductor laminate PLS can be reduced.

Third Embodiment

Figure 8A:
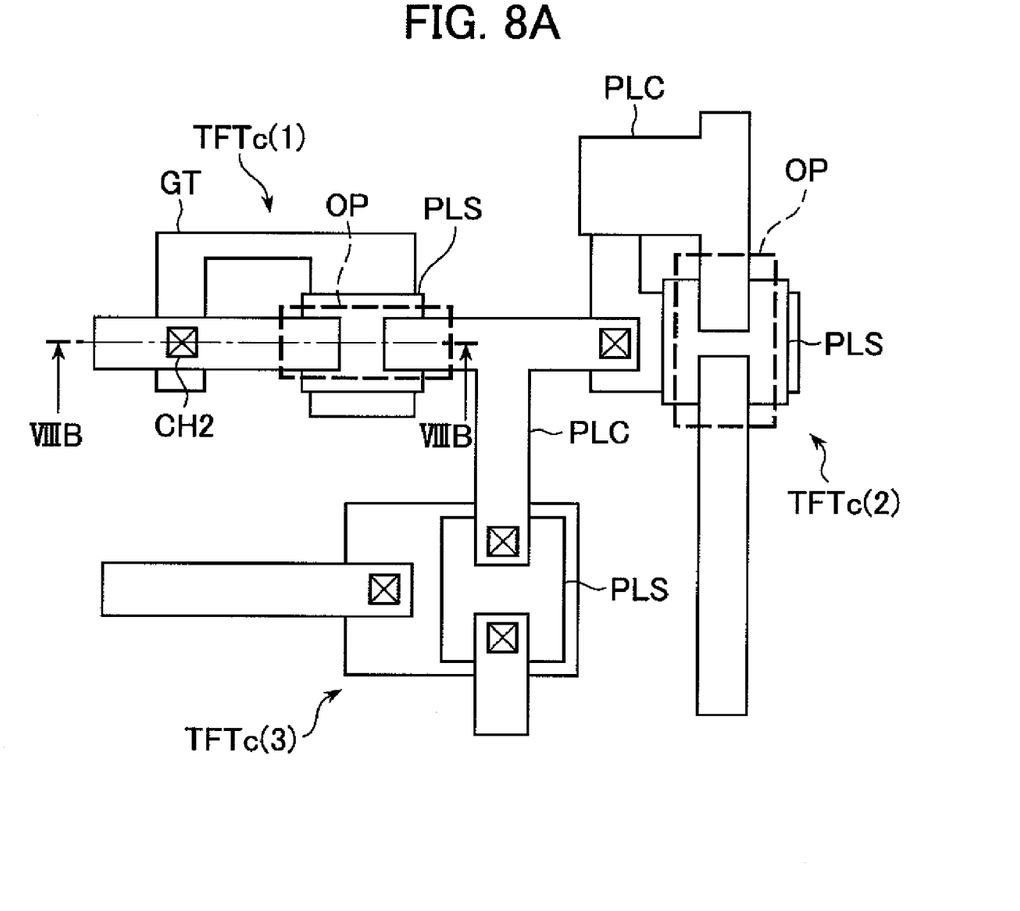
FIG. 8A is a plan view illustrating a further embodiment of a structure of a part of a peripheral circuit of a liquid crystal display device corresponding to a display device according to one or more embodiments of the present invention.
Figure 8B:
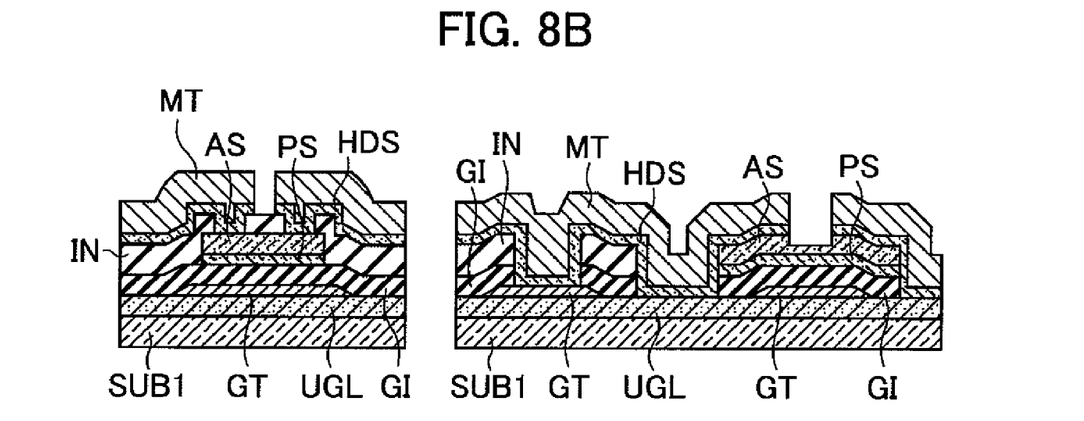
FIG. 8B is a cross-sectional view of a thin-film transistor included in the peripheral circuit and a thin-film transistor formed in the pixel.

FIGS. 8A and 8B are a plan view and a cross-sectional view, each illustrating a third embodiment of the structure of the display device according to the present invention.

(Structure of Part of Gate Driver)

FIG. 8A is a plan view illustrating a structure of a part of the gate driver GDR, which corresponds to FIG. 4. FIG. 8B is a cross-sectional view taken along a line VIIIB-VIIIB in FIG. 8A. In FIG. 8B, the thin-film transistor TFTp included in the pixel is also illustrated on the left side thereof for facilitating the comparison.

A structure illustrated in FIG. 8A differs from that illustrated in FIG. 4 in that the interlayer insulating film IN is formed on almost the entire area where the gate driver GDR is formed and in that holes for exposing the semiconductor laminate PLS therethrough are formed in the areas where the thin-film transistor TFTc(1) and the thin-film transistor TFTc(2) are formed.

In this case, the semiconductor laminate PLS is exposed such that, when viewed planarly, the exposed part thereof includes at least a portion from which the drain electrode DT and the source electrode ST at the sides of the semiconductor laminate PLS are drawn out. Thus, the drain electrode DT and the source electrode ST are electrically contacted to the polycrystalline semiconductor layer PS exposed on the side wall surfaces of the semiconductor laminate PLS.

As described above, in FIG. 4, the interlayer insulating film IN is formed only in a necessary area. On the other hand, in FIG. 8A, the interlayer insulating film IN is formed on almost the entire area where the gate driver GDR is formed, and, then, a part of the interlayer insulating film IN, which is formed in an unnecessary area, is removed.

(Manufacturing Method)

FIGS. 9A to 9D illustrate an example of the method of manufacturing the display device described in the third embodiment, each illustrating each of a series of steps. Hereinafter, the manufacturing process is described in order of steps.

Figure 9A:
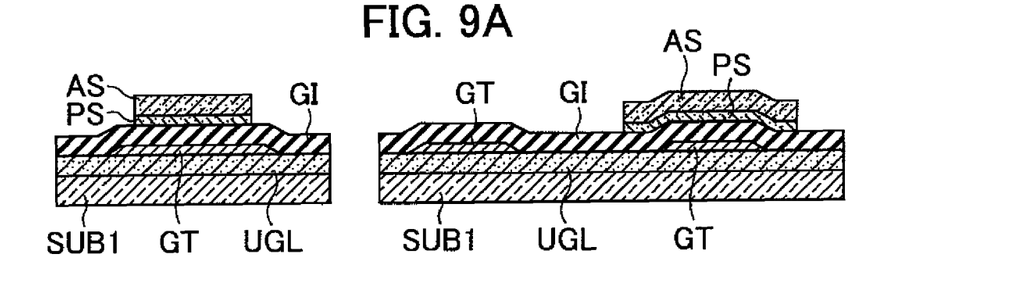
FIGS. 9A to 9D are views illustrating the further embodiment of the method of manufacturing the display device according to one or more embodiments of the present invention, each illustrating each of a series of steps.

Step 1 (FIG. 9A)

The substrate SUB1 made of, for example, glass is prepared. On a main surface of the substrate SUB1, the underlayer film UGL made of, for example, a silicon oxide film is formed at a thickness of about 300 nm. On the upper surface of the underlayer film UGL, the gate electrode GT and the like, which are made of a patterned metal film (for example, a patterned Al film) is formed at a thickness of about 150 nm. The insulating film GI made of, for example, a silicon oxide film is formed at a thickness of about 100 nm on the upper surface of the underlayer film UGL so as to cover the gate electrode GT and the like. The insulating film GI functions as the gate insulating film in the area where each of the thin-film transistors TFT is formed. On the upper surface of the insulating film GI, the laminate obtained by sequentially laminating the polycrystalline semiconductor layer PS made of polysilicon and the amorphous semiconductor layer AS made of amorphous silicon is formed. The laminate obtained by sequentially laminating the polycrystalline semiconductor layer PS and the amorphous semiconductor layer AS is formed in an island shape so as to superimpose the gate electrode GT. The polycrystalline semiconductor layer PS is formed at a thickness of about 50 nm, whereas the amorphous semiconductor layer AS is formed at a thickness of about 150 nm. The polycrystalline semiconductor layer PS can be formed by, for example, forming an amorphous silicon film and then crystallizing the amorphous silicon film using a laser annealing method or the like.

In this case, the laminate obtained by sequentially laminating the polycrystalline semiconductor layer PS and the amorphous semiconductor layer AS is formed without protruding from the gate electrode GT in the width direction of the gate electrode GT on the thin-film transistor TFTp side, whereas the laminate is formed to protrude from the gate electrode GT in the width direction of the gate electrode GT on the thin-film transistor TFTc side.

Figure 9B:
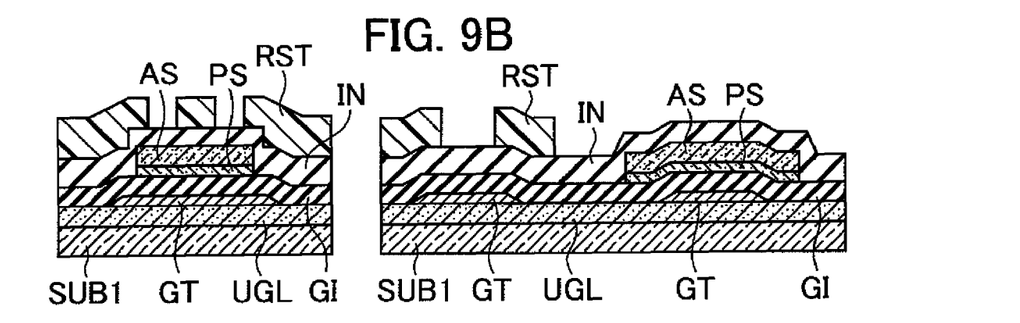

Step 2 (FIG. 9B)

On the upper surface of the substrate SUB1, the interlayer insulating film IN made of, for example, a silicon nitride film is formed at a thickness of about 500 nm so as to cover the laminate obtained by sequentially laminating the polycrystalline semiconductor layer PS and the amorphous semiconductor layer AS and the like. Next, a photoresist is applied onto the upper surface of the interlayer insulating film IN. By using a general exposure method (that is, without using half-tone exposure or the like), the patterned photoresist film RST is formed. The photoresist film RST is formed so as to cover the thin-film transistor TFTp and to expose the thin-film transistor TFTc. The holes are formed through the photoresist film RST in the areas where the electrodes of the thin-film transistor TFTp are to be formed and the area where the contact hole CH2 of the thin-film transistor TFTc is to be formed, whereby the photoresist film RST is patterned.

Figure 9C:
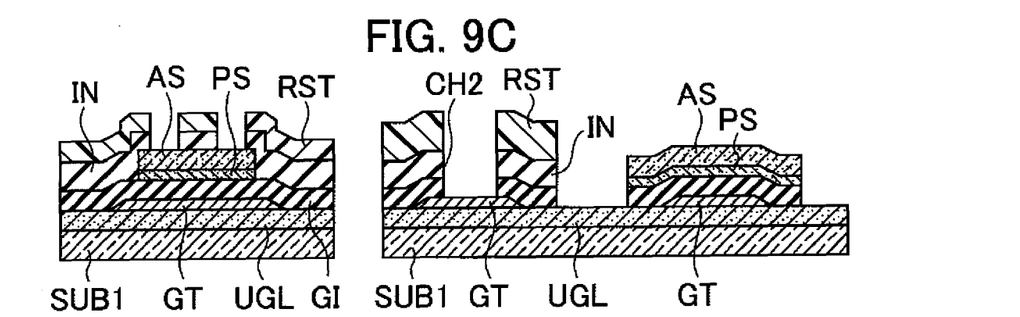

Step 3 (FIG. 9C)

The interlayer insulating film IN is subjected to, for example, dry etching using the photoresist film RST as a mask. As a result, the contact holes CH for the electrodes of the thin-film transistor TFTp are formed in the thin-film transistor TFTp, whereas the laminate obtained by sequentially laminating the polycrystalline semiconductor layer PS and the amorphous semiconductor layer AS is exposed in the thin film transistor TFTc.

Further, the insulating film GI that is the underlayer of the interlayer insulating film IN is subjected to, for example, dry etching while the photoresist film RST remains. As a result, the contact hole CH2 is formed, and the laminate obtained by sequentially laminating the gate electrode GT, the insulating film GI, the polycrystalline semiconductor layer PS, and the amorphous semiconductor layer AS is exposed in the thin-film transistor TFTc.

Figure 9D:
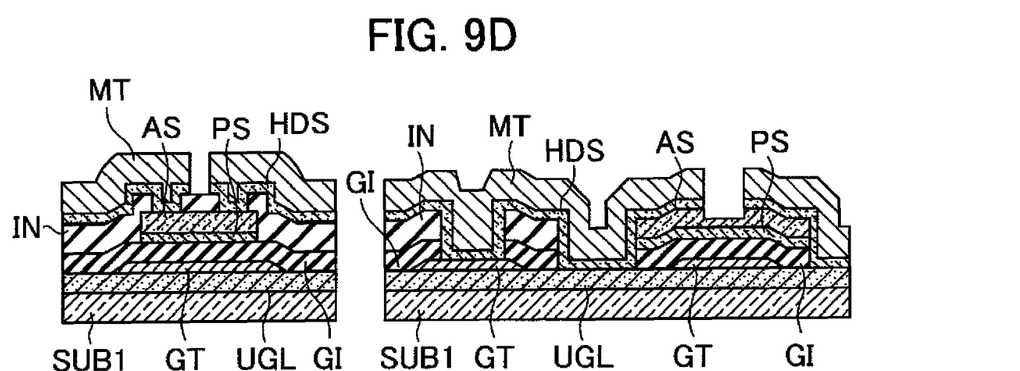

Step 4 (FIG. 9D)

The photoresist film RST is removed. Then, on the upper surface of the substrate SUB1, the heavily-doped semiconductor layer HDS made of amorphous silicon doped with impurities at a high concentration and the metal film MT are sequentially formed. The laminate obtained by sequentially laminating the heavily-doped semiconductor layer HDS and the metal film MT is patterned using selective etching according to a photolithography technique. As a result, each of the electrodes of the thin-film transistor TFTp, wirings connected to those electrodes, each of the electrodes of the thin-film transistor TFTc, and wirings connected to those electrodes are formed.

The etching in Step 4 is performed until the heavily-doped semiconductor layer HDS is fully removed in a region between the electrodes of the thin-film transistor TFTc and until the amorphous semiconductor layer AS that is the underlayer of the heavily-doped semiconductor layer HDS is slightly concaved (until a concave portion is formed). Such an etching perfectly isolates the electrodes electrically.

Fourth Embodiment

Each of the embodiments described above has been described taking the liquid crystal display device as an example. However, the application of the present invention is not limited to the liquid crystal display device and the present invention is also applicable to, for example, an organic EL display device.

Figure 10:
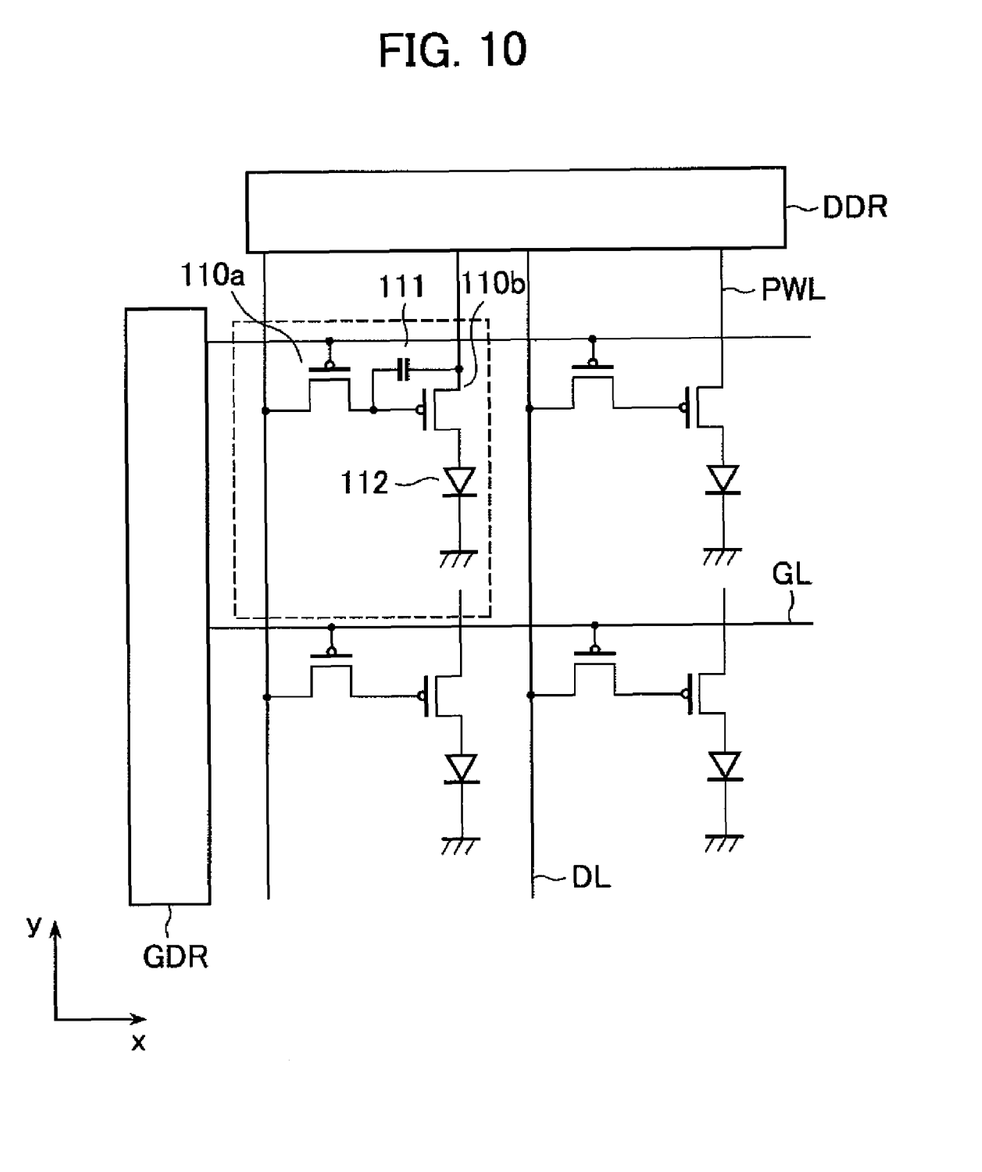
FIG. 10 is an equivalent circuit diagram illustrating an embodiment of an organic EL display device corresponding to the display device according to one or more embodiments of the present invention.

FIG. 10 is a diagram illustrating an equivalent circuit in a display area of an organic EL display device. In FIG. 10, the gate signal lines GL, each extending in the x-direction of FIG. 10, are formed to be arranged in parallel in the y-direction of FIG. 10. One end of each of the gate signal lines GL is connected to the gate driver GDR so that the scanning signals are sequentially fed to the gate signal lines GL. Power feed lines PWL, each extending in the y-direction of FIG. 10, are formed to be arranged in parallel in the x-direction of FIG. 10. Further, the drain signal lines DL, each extending in the y-direction of FIG. 10, are formed to be arranged in parallel in the x-direction of FIG. 10. One end of each of the drain signal lines DL is connected to the drain driver DDR so that the video signals are fed to the drain signal lines DL.

A pixel area corresponds to an area surrounded by a dot-line frame illustrated in FIG. 10. The display area is constituted by a set of a plurality of the pixels arranged in matrix. In the pixel area, a switching element 110a, an auxiliary capacitor 111, a current control element 110b, and an organic EL element 112 are formed. The scanning signal is fed from the gate signal line GL to turn the switching element 110a ON.

Then, electric charges are accumulated in the auxiliary capacitor 111 to control a current flowing through the current control element 110b. Then, the current flows through the power feed line PWL, the organic EL element 112, and the current control element 110b. The organic EL element 112 emits light at a brightness based on a value of the current.

Figure 11:
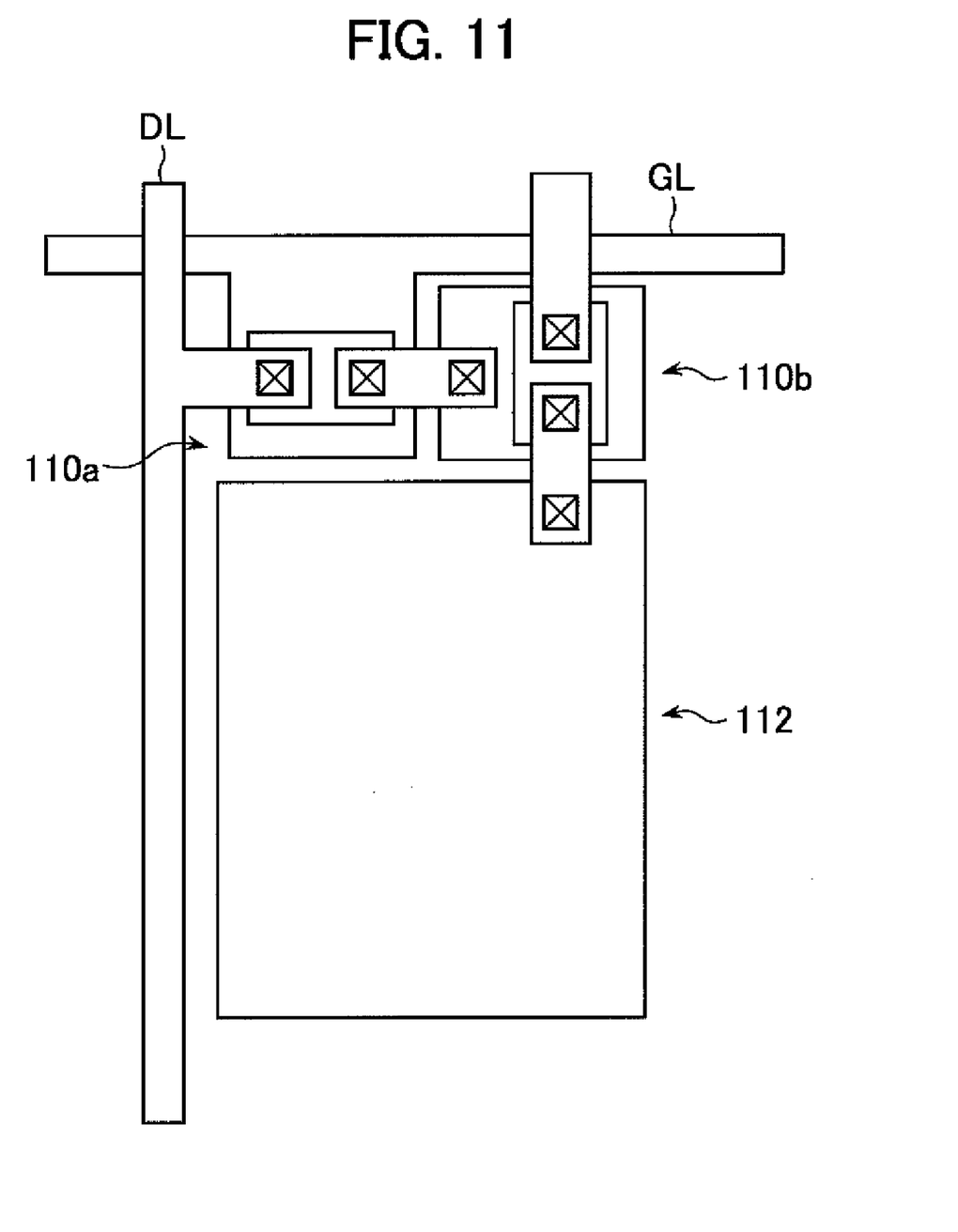
FIG. 11 is a plan view illustrating the embodiment of the pixel of the organic EL display device corresponding to the display device according to one or more embodiments of the present invention.

FIG. 11 is a plan view illustrating a structure of the pixel formed on the substrate. Each of the switching element 110a and the current control element 110b illustrated in FIG. 10 is formed by the thin-film transistor and has the same structure as that of the thin-film transistor TFTp formed in the pixel of the liquid crystal display device (see FIG. 3).

Although not shown, each of the thin-film transistors formed in the gate driver GDR has the same structure as that of each of the thin-film transistors TFTc described in each of the embodiments described above.

Although the organic EL element 112 is illustrated in a simplified manner in FIG. 11, the organic EL element 112 actually includes a laminate of an organic EL layer and an electrode (cathode), which is formed on a surface of an electrode (anode) connected to the current control element 110b. In this case, at least one of the electrodes is formed of a transparent conductive film. This is for radiating light emitted from the organic EL layer through the transparent conductive film.

Fifth Embodiment

In each of the embodiments described above, for example, glass is used as a material of the substrate. However, the material of the substrate is not limited thereto, and quartz glass or a resin may also be used. By using the quartz glass for the substrate, a process temperature can be increased to, for example, densify the gate insulating film. As a result, the reliability of characteristics of the thin-film transistor can be improved. Moreover, by using the resin for the substrate, the light-weight liquid crystal display device excellent in impact resistance can be obtained.

Sixth Embodiment

In each of the embodiments described above, the silicon oxide film is formed as the underlayer film formed on the surface of the substrate. However, the underlayer film is not limited thereto. A silicon nitride film or a laminate film of the silicon oxide film and the silicon nitride film may also be used. By using the silicon nitride film for a part of or the entirety of the underlayer film, the impurities in the substrate can be effectively prevented from being diffused into the gate insulating film. For the same reason, the gate insulating film may be formed of a laminate film of, for example, the silicon oxide film and the silicon nitride film.

Seventh Embodiment

In the embodiments described above, the amorphous silicon is crystallized by the laser annealing. However, the method of crystallizing the amorphous silicon is not limited thereto. A solid-phase growth method with thermal annealing may be used, or the combination of the thermal annealing and the laser annealing may be performed. Moreover, a method of directly forming a polysilicon film by using reactive thermal CVD may be used without crystallizing the amorphous silicon. In this case, the reduction of the number of crystallization steps improves a throughput. For the polysilicon layer, microcrystalline silicon having a particle diameter of about 20 nm to 100 nm may be used. Moreover, a compound of silicon and germanium may also be used. In this case, the performance of the thin-film transistor TFT can be improved.

Eighth Embodiment

Although a material of each of the gate signal line and the gate electrode has not been specifically described in the embodiments described above, for example, a metal such as Ti, TiW, TiN, W, Cr, Mo, Ta, Nb, or an alloy thereof may be used.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A display device comprising:
   a display area on a substrate, comprising a plurality of pixels that respectively comprises a first thin-film transistor therein; and
   a peripheral circuit formed in a periphery of the display area and on the substrate, wherein the peripheral circuit comprises a second thin-film transistor therein,
   wherein the first thin-film transistor comprises:
      a gate electrode;
      a gate insulating film formed so as to cover the gate electrode;
      an semiconductor layer in an island shape formed on an upper surface of the gate insulating film so as to superimpose the gate electrode without protruding from the gate electrode when viewed planarly;
      an insulating film formed so as to cover the semiconductor layer; and
      a pair of electrodes electrically connected to the semiconductor layer respectively through a pair of through holes that are formed through the insulating film,
      wherein the semiconductor layer of the first thin-film transistors is formed of a laminate obtained by sequentially laminating a crystalline semiconductor layer and an amorphous semiconductor layer, and
      wherein each of the pair of electrodes is formed of a laminate obtained by sequentially laminating a semiconductor layer doped with impurities and a metal layer;
   wherein the second thin-film transistors comprises:
      a gate electrode;
      a gate insulating film formed so as to cover the gate electrode;
      an semiconductor layer in an island shape formed on an upper surface of the gate insulating film so as to superimpose the gate electrode without protruding from the gate electrode as viewed planarly; and
      a pair of electrodes formed on a surface of the semiconductor layer,
      wherein the semiconductor layer of the second thin-film transistors is formed of the laminate obtained by sequentially laminating the crystalline semiconductor layer and the amorphous semiconductor layer, and
      wherein each of the pair of electrodes is formed of the laminate obtained by sequentially laminating the semiconductor layer doped with the impurities and the metal layer.

2. The display device according to claim 1, wherein the second thin-film transistor further comprises an insulating film formed so as to cover the semiconductor layer, wherein the pair of electrodes is electrically connected to the semiconductor layer respectively through a pair of through holes that are formed at the insulating film.

3. The display device according to claim 1, wherein, in the second thin-film transistor, one electrode of the pair of electrodes is electrically connected to the gate electrode through a contact hole formed at the gate insulating film.

4. The display device according to claim 1, wherein, in the second thin-film transistor, the amorphous semiconductor layer is exposed on a surface of the semiconductor layer by etching, and the surface of the semiconductor layer is exposed from the pair of electrodes.

5. The display device according to claim 1, wherein, in the second thin-film transistor, the insulating film is partially formed on a surface of the semiconductor layer, and ends of the pair of electrodes that are opposed to each other are respectively formed so as to be superimposed on the insulating film.

6. The display device according to claim 2, wherein the display device comprises a liquid crystal display device.

7. The display device according to claim 2, wherein the display device comprises an organic electroluminescent display device.

8. A display device comprising:
a display area on a substrate including a plurality of pixels that comprise a first thin-film transistor therein; and
a peripheral circuit formed in a periphery of the display area and on the substrate, wherein the peripheral circuit comprises a second thin-film transistor therein
wherein the first thin-film transistors comprises:
a gate electrode;
a gate insulating film formed so as to cover the gate electrode;
an semiconductor layer in an island shape formed on an upper surface of the gate insulating film so as to superimpose the gate electrode without protruding from the gate electrode when viewed planarly;
an insulating film formed so as to cover the semiconductor layer; and
a pair of electrodes electrically connected to the semiconductor layer respectively through a pair of through holes formed through the insulating film,
wherein the semiconductor layer of the first thin-film transistors is formed of a laminate obtained by sequentially laminating a crystalline semiconductor layer and an amorphous semiconductor layer, and
wherein each of the pair of electrodes is formed of a laminate obtained by sequentially laminating a semiconductor layer doped with impurities and a metal layer;
wherein each of the second thin-film transistors comprises:
a gate electrode;
a gate insulating film formed so as to cover the gate electrode;
an semiconductor layer in an island shape formed on an upper surface of the gate insulating film so as to superimpose the gate electrode and to protrude from the gate electrode in a width direction of the gate electrode as viewed planarly; and
a pair of electrodes formed on a surface of the semiconductor layer,
wherein the semiconductor layer of the second thin-film transistors is formed of a laminate obtained by sequentially laminating the crystalline semiconductor layer and the amorphous semiconductor layer, and
wherein the pair of electrodes is formed of the laminate obtained by sequentially laminating the semiconductor layer doped with the impurities and the metal layer,
wherein the pair of electrodes is formed to extend in the width direction of the gate electrode.

9. The display device according to claim 8, wherein, in the second thin-film transistor, one electrode of the pair of electrodes is electrically connected to the gate electrode through a contact hole formed at the gate insulating film.

10. The display device according to claim 8, wherein, in the second thin-film transistors, the amorphous semiconductor layer is exposed by etching on a surface of the semiconductor layer, and the surface of the semiconductor layer is exposed from the pair of electrodes.

11. The display device according to claim 8, wherein, in the second thin-film transistor, the insulating film is partially formed on a surface of the semiconductor layer, and ends of the pair of electrodes that are opposed to each other are formed so as to be superimposed on the insulating film.

* * * * *